(12) United States Patent
Zhang et al.

(10) Patent No.: US 6,189,524 B1
(45) Date of Patent: Feb. 20, 2001

(54) METHOD AND DEVICE FOR MONITORING AN INTERNAL COMBUSTION ENGINE

(75) Inventors: Hong Zhang, Tegernheim; Erwin Achleitner, Obertraubling, both of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/544,935

(22) Filed: Apr. 7, 2000

Related U.S. Application Data

(63) Continuation of application No. PCT/DE98/02684, filed on Sep. 10, 1998.

(30) Foreign Application Priority Data

Oct. 7, 1997 (DE) ............................................. 197 44 264

(51) Int. Cl.$^7$ .................................................. F02D 41/22
(52) U.S. Cl. ........................... 123/690; 123/690; 123/479
(58) Field of Search .................................. 123/479, 690, 123/682; 701/104, 107

(56) References Cited

U.S. PATENT DOCUMENTS

| 5,657,737 | * | 8/1997 | Ishida et al. | 123/690 |
| 6,016,794 | * | 1/2000 | Hashimoto et al. | 123/682 |
| 6,112,731 | * | 9/2000 | Linenberg et al. | 123/690 |

FOREIGN PATENT DOCUMENTS

| 41 31 226 | 3/1992 | (DE) . |
| 34 14 588 C2 | 6/1992 | (DE) . |
| 42 32 974 A1 | 4/1994 | (DE) . |
| 44 26 972 A1 | 2/1996 | (DE) . |
| 44 45 462 A1 | 6/1996 | (DE) . |
| 195 37 381 A1 | 4/1997 | (DE) . |
| 195 45 221 A1 | 6/1997 | (DE) . |
| 196 30 213 C1 | 7/1997 | (DE) . |
| 2 739 331 | 4/1997 | (FR) . |

OTHER PUBLICATIONS

Published International Application No. WO 96/32579 (Treinies et al.), dated Oct. 17, 1996.

* cited by examiner

Primary Examiner—Erick Solis
(74) Attorney, Agent, or Firm—Herbert L. Lerner; Laurence A. Greenberg; Werner H. Stemer

(57) ABSTRACT

An estimated value of the amount of fuel which is metered into a cylinder per working cycle is calculated. An estimated value of the indicated torque of the internal combustion engine is calculated as a function of the estimated value of the amount of fuel. An emergency operating mode of the internal combustion engine is actuated if the estimated value and a setpoint value of the indicated torque fulfill a predefined condition.

9 Claims, 4 Drawing Sheets

METHOD AND DEVICE FOR MONITORING AN INTERNAL COMBUSTION ENGINE

CROSS-REFERENCE TO RELATED APPLICATION

This is a continuation of copending International Application PCT/DE98/02684, filed Sep. 10, 1998, which designated the United States.

BACKGROUND OF THE INVENTION

1. Field of the Invention

The invention lies in the field of automotive technology. More specifically, the invention relates to a method and a device for monitoring an internal combustion engine, in particular an internal combustion engine with direct injection of the fuel and/or extensive throttle-free load control.

A pertinent a prior art method for controlling an internal combustion engine is described in German published patent application DE 42 32 974 A1. There, a setpoint value of a torque which is to be set by means of the air mass flow rate is determined in a device for predefining the output torque. An estimated value of an ignition-angle-standardized actual torque is derived either from the measurement signal of a torque sensor or from the rate at which the air mass is aspirated into the combustion chambers. An ignition angle is adjusted as a function of the deviation between the setpoint value and the standardized estimated value of the torque. Unfortunately, torque sensors are still too expensive or not reliable enough for use in series-produced engines. On the other hand, determining the actual torque as a function of the sensed air mass flow rate supplies sufficiently precise values only for internal combustion engines which are controlled by means of the air mass flow rate.

2. Summary of the Invention

It is accordingly an object of the invention to provide a method and a device for monitoring an internal combustion engine, which overcomes the above-mentioned disadvantages of the heretofore-known devices and methods of this general type and which is operated with a high excess air factor of the air/fuel mixture and which method and device are reliable and simple.

With the foregoing and other objects in view there is provided, in accordance with the invention, a method of monitoring an internal combustion engine, which comprises the following steps:

measuring an excess air factor with an oxygen probe arranged in an exhaust tract of an internal combustion engine;

calculating an estimated value of an amount of fuel actually being metered into a cylinder per working cycle in dependence on the excess air factor determined by the oxygen probe;

calculating an estimated value of an indicated torque of the internal combustion engine as a function of the estimated value of the amount of fuel; and actuating an emergency operating mode of the internal combustion engine if the estimated value of the indicated torque and a setpoint value of the indicated torque satisfy a predefined condition.

The estimated value of the indicated torque can be calculated with a high level of quality because the actual amount of fuel is the deciding influencing variable for the value of the actual indicated torque.

The invention has the advantage that it monitors the fuel system which comprises the fuel pump and injection valves.

In accordance with an added feature of the invention, the excess air factor is corrected as a function of a secondary air mass flow rate.

In accordance with an additional feature of the invention, the estimated value of the indicated torque is additionally determined as a function of a mass flow rate into the cylinder.

In accordance with another feature of the invention, the setpoint value of the indicated torque is determined in dependence on a pedal value and a rotational speed of the internal combustion engine.

In accordance with a further feature of the invention, the predefined condition is a set difference between the estimated value and the setpoint value.

With the above and other objects in view there is also provided, in accordance with the invention, a method of monitoring an internal combustion engine, which comprises the following steps:

measuring an excess air factor with an oxygen probe arranged in an exhaust tract of an internal combustion engine;

calculating an estimated value of an amount of fuel actually being metered into a cylinder per working cycle in dependence on the excess air factor determined by the oxygen probe;

actuating an emergency operating mode of the internal combustion engine if the estimated value and a setpoint value of the amount of fuel satisfy a predefined condition.

In accordance with again an added feature of the invention, the excess air factor is corrected as a function of a secondary air mass flow rate.

In accordance with again an additional feature of the invention, the predefined condition is considered satisfied if a difference between the estimated value and the setpoint value of the amount of fuel is greater than a predefined threshold value for longer than a predefined time period.

With the above and other objects in view there is provided, in accordance with an alternative of the invention, a device for monitoring an internal combustion engine of the type having an exhaust gas tract and an oxygen probe in the exhaust gas tract, the device comprising:

a first device for calculating an estimated value of an amount of fuel being metered into a cylinder per working cycle, the estimated value of the amount of fuel being calculated as a function of an excess air factor determined by an oxygen probe in the exhaust tract of the internal combustion engine;

a second device for calculating an estimated value of an indicated torque of the internal combustion engine as a function of the estimated value of the amount of fuel; and a third device for controlling an emergency operating mode of the internal combustion engine if the estimated value of the indicated torque and a setpoint value of the indicated torque fulfill a predefined condition.

The first, second, and third devices may be embodied a separate functional units or individual program batches of a single processor.

It is advantageous for the estimated value of the amount of fuel is calculated as a function of an excess air factor which is determined by an oxygen probe arranged in the exhaust tract of the internal combustion engine. The excess air factor is a measured value with which the estimated value of the amount of fuel is calculated independently of a setpoint value of the amount of fuel.

Other features which are considered as characteristic for the invention are set forth in the appended claims.

Although the invention is illustrated and described herein as embodied in a method and device For monitoring an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

Structurally and functionally equivalent elements are identified with the same reference symbols throughout the figures.

DESCRIPTION OF THE PREFERRED EMBODIMENTS

Figure 1:
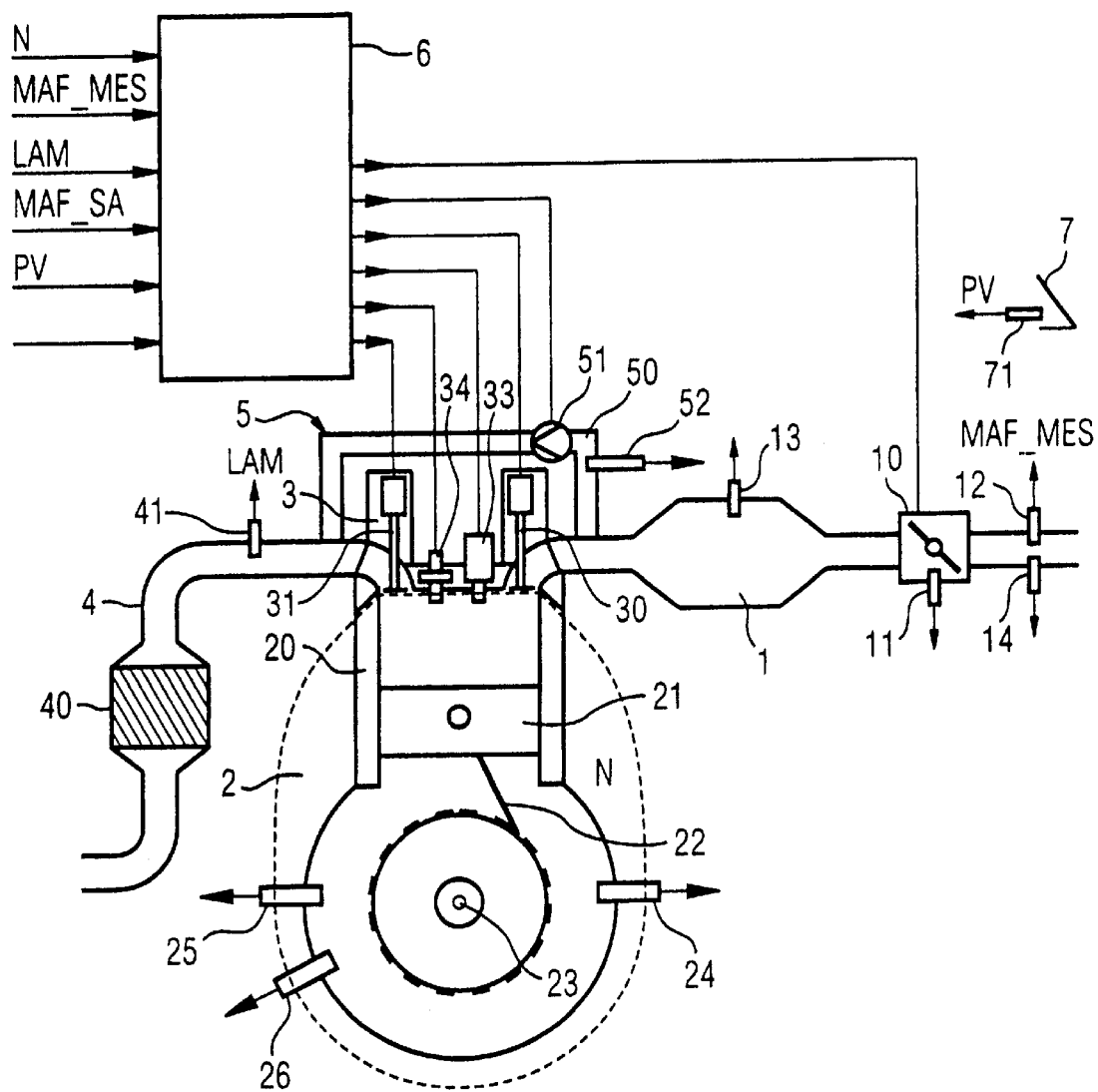
FIG. 1 is a schematic diagram of an internal combustion engine with a monitoring device.

Referring now to the figures of the drawing in detail and first, particularly, to FIG. 1 thereof, there is shown an internal combustion engine with an intake tract 1 with a throttle valve 10 and an engine block 2 which has a cylinder 20 and a crankshaft 23. A piston 21 and a connecting rod 22 are assigned to the cylinder 20. The connecting rod 22 is connected to the piston 21 and to the crankshaft 23.

A cylinder head 3 is provided in which a valve drive is arranged with at least one inlet valve 30 and one outlet valve 31. The valve drive comprises at least one non-illustrated cam shaft with a transmission device which transmits the stroke of the cam to the inlet valve 30 or the outlet valve 31. Devices for adjusting the valve stroke times and the profile of the valve stroke may also be provided. As an alternative, an electromagnetic actuator which controls the profile of the valve stroke of the inlet valve 30 or outlet valve 31 may also be provided.

An injection valve 33 and a spark plug 34 are further provided in the cylinder head 3. The injection valve 33 is arranged in such a way that the fuel is metered directly into the space of the cylinder 20. The injection valve 33 can, however, also be arranged in such a way that the fuel is metered into the intake tract 1. The internal combustion engine is illustrated in FIG. 1 with one cylinder. It will be understood, however, that the engine may also comprise a plurality of cylinders.

The internal combustion engine communicates with an exhaust tract 4 with a catalytic converter 40 and an oxygen probe 41. A secondary air device 5 has a secondary air pipe 50 which leads from the intake tract 1 to the exhaust tract 4. A secondary air pump 51 is arranged in the secondary air pipe 50.

A monitoring device, which will be referred to below as the control device 6—in addition to monitoring the internal combustion engine it also performs control functions of the internal combustion engine—is provided are assigned which sense various measurement variables and each determine the measured value of the measurement variable. The control device 6 determines, as a function of at least one measurement variable, one or more adjustment signals which each control an actuator unit.

The sensors include a pedal position signal-transmitter 71 which senses a pedal position PV of the accelerator pedal 7, a throttle valve position signal-transmitter 11 which senses a degree of opening of the throttle valve 10, an air mass flow rate meter 12 which senses an air mass flow rate, and/or an intake manifold pressure sensor 13 which senses an intake manifold pressure in the intake tract 1, a first temperature sensor 14 which senses an air intake temperature TAL, a rotational speed signal-transmitter 25 which senses a rotational speed N of the crankshaft 23, a secondary air mass flow rate meter 52 which senses a secondary air mass flow rate MAF_SA in the secondary air pipe 50, a second and third temperature sensor 25, 26 which sense a coolant temperature TCO or an oil temperature TOIL, and the oxygen probe 41 which senses the residual oxygen content of the exhaust gas in the exhaust tract 4 and which assigns an excess air factor LAM to the latter. Depending on the embodiment of the invention, any desired subset of the aforementioned sensors, or also additional sensors, may be provided.

Operational variables comprise the measurement variables and variables which are derived from them and which are determined by means of a characteristic diagram relationship or by means of an observer which calculates the estimated value of the operational variables.

The actuator units each comprise an actuator drive and an actuator element. The actuator drive is an electromotive drive, an electromagnetic drive, a mechanical drive, or any other drive that is known to those of skill in the pertinent art. The actuator elements are embodied as a throttle valve 10, as an injection valve 11, as a spark plug 34 or as a device for adjusting the valve stroke of the inlet valves 30 or outlet valves 31. Reference is made to the actuator units below with the respectively assigned actuator element.

The control device is preferably embodied as an electronic engine controller. However, it can also comprise a plurality of control units which are electrically connected to one another. The connection may be via a bus system.

The function of the part of the control device 7 which relates to the invention will now be explained with reference to the block circuit diagram in FIG. 2 and the flow chart in FIG. 3.

Figure 2:
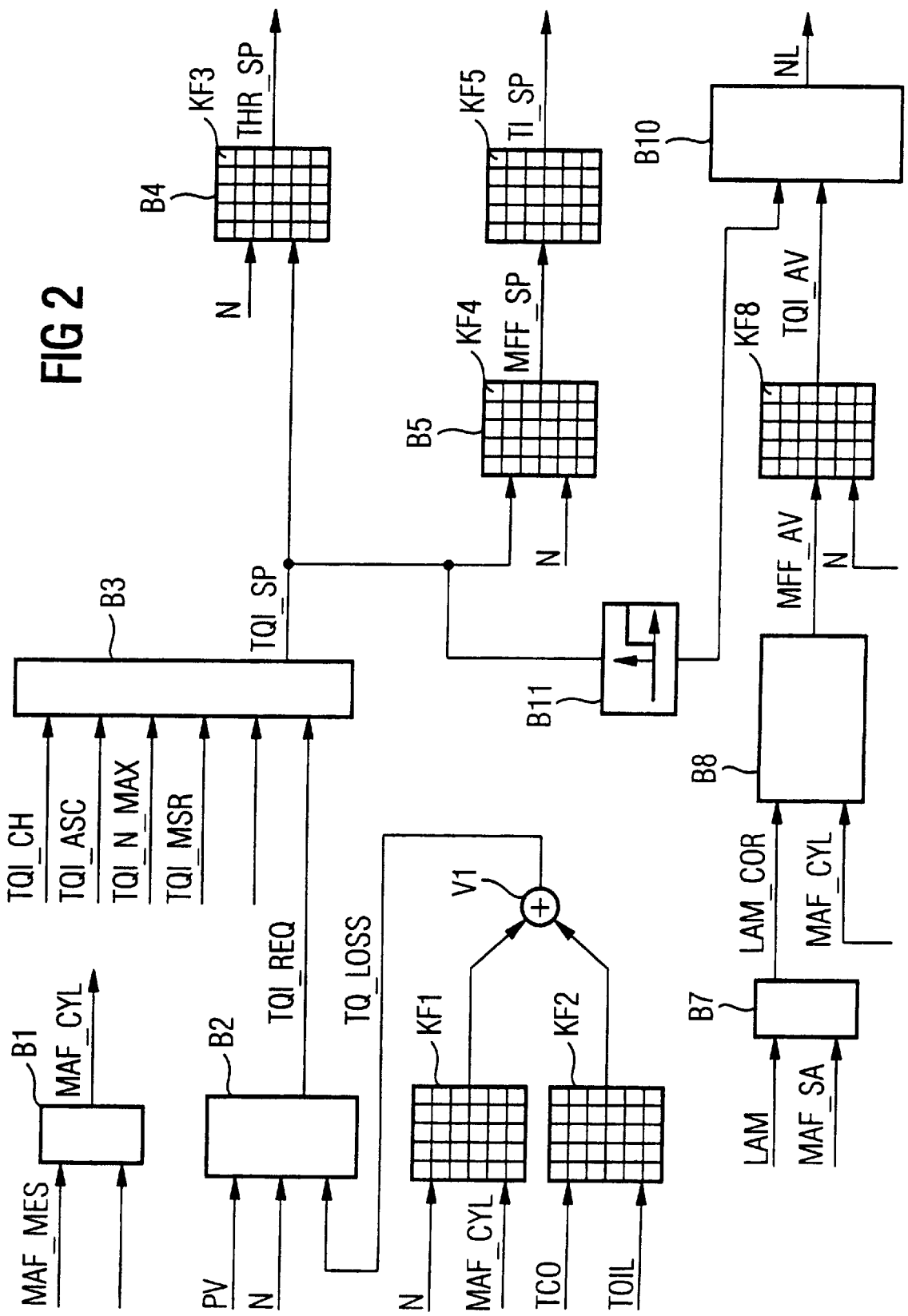
FIG. 2 is a block diagram of the monitoring device.
Figure 3:
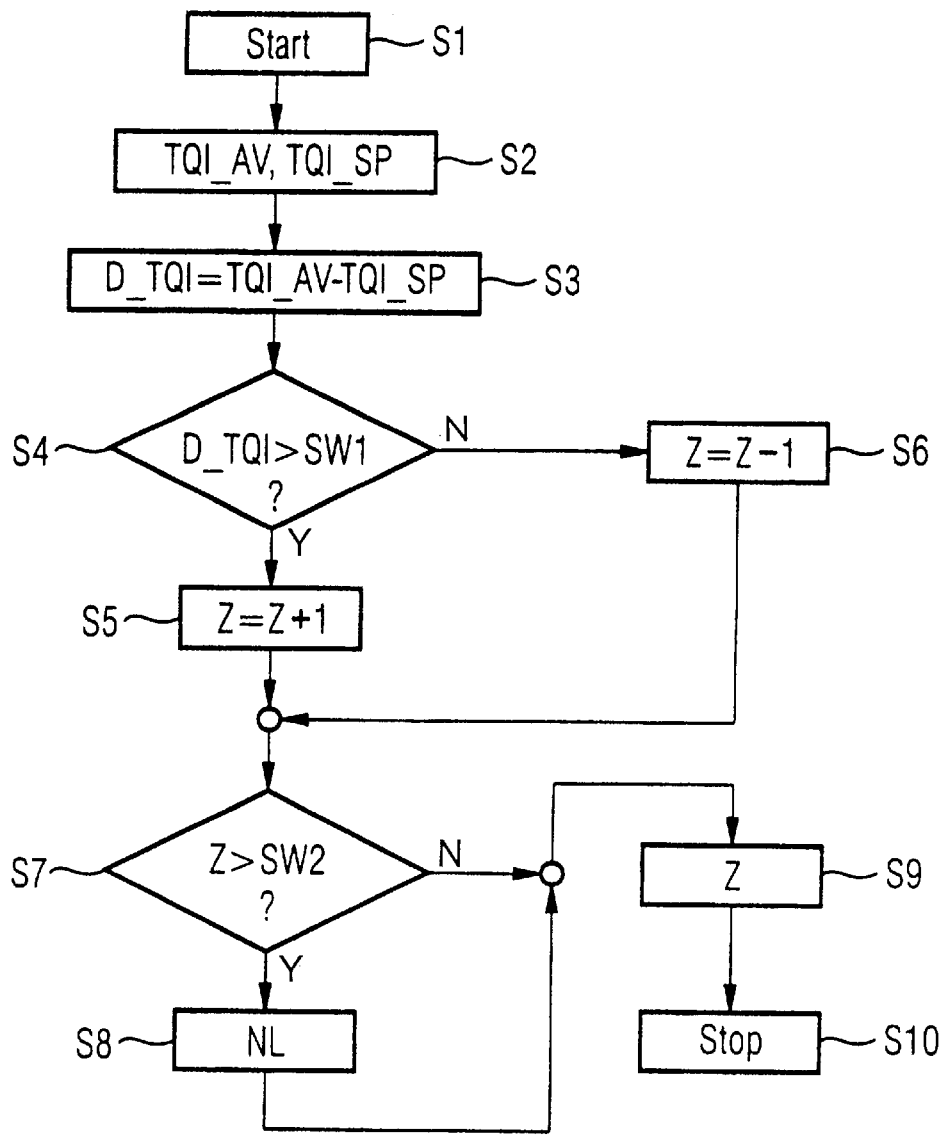
FIG. 3 is a flowchart of the monitoring algorithm.

An estimated value MAF_CYL of the air mass flow rate in the cylinder 20 is calculated in a block B1 (FIG. 2). The calculation uses a filling model of the intake tract 1 as a function of the measured value MAF_MES of the air mass flow rate and of further operational variables. Such a model is disclosed in the international PCT publication WO 96/32579, the content of which is hereby incorporated by reference.

A characteristic diagram KF1 (characteristic field) is provided from which a first contribution to a loss torque TQ_LOSS is determined as a function of the rotational speed N, the estimated value MAF_CYL of the air mass flow rate in the cylinder 20. The first contribution to the loss torque TQ_LOSS takes into account pump losses in the internal combustion engine and losses which occur as a result of the friction for predefined reference values of the coolant temperature TCO and of the oil temperature TOIL. A second contribution to the loss torque is determined from a characteristic diagram KF2 as a function of the oil temperature TOIL and/or of the coolant temperature TCO. The contributions of the loss torque TQ_LOSS are then added in a logic combination point V1.

In a block B2, a minimum available torque and a maximum available torque are determined as a function of the loss torque TQ_LOSS and the rotational speed N. The proportion of the torque available which is demanded by the driver is determined from the pedal position PV and the rotational speed N. A desired indicated torque TQI_REQ is then determined from the proportion of the torque which is demanded by the driver, the available torque and the loss torque TQ_LOSS.

An indicated torque is, in each case, the torque which is ideally generated without taking into account losses.

In a block B3, a setpoint value TQI_SP of the indicated torque is determined as a function of the desired indicated torque TQI_REQ and of further torque demands. These torque demands are, for example, a torque, TQI_CH, demanded to heat the catalytic converter 41, a torque demand TQI_ASC for a traction controller, a torque demand TQI_N_MAX of a rotational-speed-limiting function or the torque demand TQI_MSR of an engine torque controller.

By means of a characteristic diagram KF3, a setpoint value of the degree of opening THR_SP of the throttle valve is assigned to a block B3, the setpoint value TQI_SP of the indicated torque as a function of the rotational speed N. A particularly precise calculation of the setpoint value THR_SP of the degree of opening of the throttle valve is obtained if flow losses as a result of the reduced flow cross section of the throttle valve 10 in the intake tract are also taken into account in the block B4. The setpoint value THR_SP is fed to a controller which generates an adjustment signal for controlling the throttle valve 10.

The setpoint value THR_SP of the degree of opening of the throttle valve is also calculated as a function of whether the internal combustion engine is operated with a layered charge or a homogeneous charge.

A block B5 comprises a characteristic diagram KF4, from which a setpoint value MFF_SP of the amount of fuel which is to be injected into the cylinder 20 per working cycle is determined as a function of the rotational speed N and the setpoint value TQI_SP of the indicated torque. The setpoint value MFF_SP of the amount of fuel in the block B5 can additionally be determined taking into account further operational variables, and as a function of whether the internal combustion engine is operated with layered charge or with homogeneous charge, or using additional dynamic transmission elements.

In a characteristic diagram KF5, a setpoint value of an injection time period TI_SP, and if appropriate also of a start-of-injection angle are determined as a function of the setpoint value MFF_SP of the amount of fuel. The injection valve 33 is then actuated in accordance with the setpoint value TI_SP of the injection time period and of the start-of-injection angle.

In a block B7, the excess air factor LAM is corrected as a function of the secondary air mass flow rate MAF_SA. The corrected excess air factor LAM_COR represents, with a high degree of precision, the excess air factor in the combustion space (combustion chamber) after the combustion of the air/fuel mixture. In a block B4, the estimated value MFF_AV of the actual amount of fuel is determined as a function of the corrected excess air factor LAM_COR and the estimated value MAF_CYL of the air mass flow rate of the cylinder 20. The estimated value MFF_AV is determined by the following relationship:

$$MFF\_AV = MAF\_CYL/(LAM\_COR \cdot L\_ST)$$

where L_ST is a stoichiometric factor.

An estimated value TQI_AV of the actual indicated torque is determined from a characteristic diagram KF8 as a function of the estimated value MFF_AV of the actual amount of fuel, and the rotational speed N. Alternatively, the estimated value TQI_AV can also be determined by means of a physical model of the internal combustion engine.

In block B10, a control signal for an emergency operating mode NL is determined. The input variables of the block B10 are the setpoint value TQI_SP of the torque, which is delayed in a block B11 in accordance with a delay time which is dependent on the start-of-injection angle of the injection valve 33 and the point in time at which the assigned excess air factor LAM is sensed by the oxygen probe 41. The second input variable of the block B10 is the estimated value TQI_AV of the indicated torque.

The operation of the block B10 will now be described with reference to the flowchart in FIG. 3:

The function starts in a step S1. The value of a counter Z is read in from a memory.

In a step S2, the input variables of the block B10, the estimated value TQI_AV and the setpoint value TQI_SP of the indicated torque are sensed. In a step S3, the difference D_TQI between the estimated value TQI_AV and the setpoint value TQI_SP of the actual indicated torque is determined.

In a step S4 it is checked whether the difference D_TQI is greater than a first redefined threshold value SW1. If this is the case, in a step S5 the counter is increased by the value one (Z=Z+1). If the answer to the query in S4 is not in the affirmative, the counter is reduced by the value one (Z=Z−1) in a step S6.

In a step S7, it is checked whether the counter Z is greater than a predefined second threshold value SW2. If this is the case, an emergency operating function NL is started in the step S8. The emergency operating function NL is a torque limitation or a rotational speed limitation by means of the injection and/or the ignition and/or the filling.

In a step S9, the numerical value Z is stored and in a step S10 the function is terminated. The function is preferably processed periodically.

Alternatively, the predefined condition for an emergency operating mode can also be configured in such a way that the difference between the estimated value TQI_AV and the setpoint value TQI_SP of the indicated torque is integrated for a predefined time period, specifically starting a point in time at which the estimated value TQI_AV is greater than the setpoint value TQI_SP of the indicated torque. The condition is fulfilled if the integral is greater than a threshold value. The condition can also be embodied in any other desired way.

Figure 4:
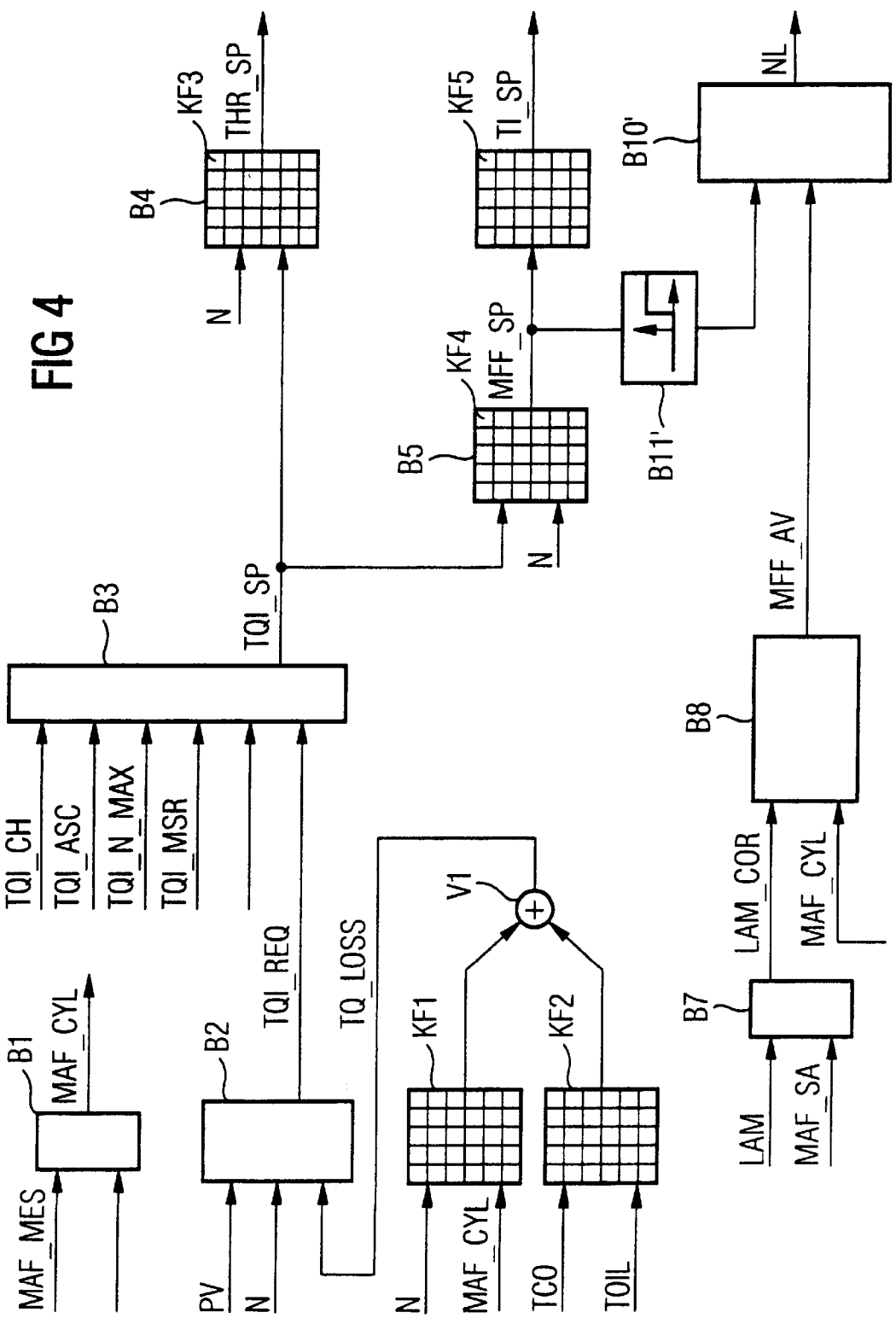
FIG. 4 is a further block diagram of the monitoring device.

A further alternative embodiment is illustrated in FIG. 4. In a block B10', the control signal for the emergency operating mode NL is determined. The input variables of the block B10' are the setpoint value MFF_SP of the amount of fuel which is delayed in a block B11' in accordance with a delay time which is dependent on the start-of-injection angle of the injection valve 33 and the point in time at which the assigned excess air factor LAM is sensed by the oxygen probe 41. The second input variable of the block B10' is the estimated value MFF_AV of the amount of fuel. The method of operation of the block B10' corresponds to that of the block B10 from FIG. 3, and all that is necessary is for the setpoint value TQI_SP and the estimated value TQI_AV of the indicated torque to be replaced by the setpoint value MFF_SP and the estimated value MFF_AV of the amount of fuel.

It will be understood that the invention is not restricted to the exemplary embodiments described. Thus, the internal combustion engine can also be embodied as a so-called leanburn engine. The emergency operating function can also be an acceleration limitation. The characteristic diagrams are empirically determined by means of trials on an engine test bed, by means of driving trials or by simulations. The oxygen probe is preferably embodied as linear lambda probe.

We claim:

1. A method of monitoring an internal combustion engine, which comprises the following steps:

measuring an excess air factor with an oxygen probe arranged in an exhaust tract of an internal combustion engine;

calculating an estimated value of an amount of fuel actually being metered into a cylinder per working cycle in dependence on the excess air factor determined by the oxygen probe;

calculating an estimated value of an indicated torque of the internal combustion engine as a function of the estimated value of the amount of fuel; and actuating an emergency operating mode of the internal combustion engine if the estimated value of the indicated torque and a setpoint value of the indicated torque satisfy a predefined condition.

2. The method according to claim 1, which further comprises measuring a secondary air mass flow rate, and correcting the excess air factor as a function of the secondary air mass flow rate.

3. The method according to claim 1, which comprises additionally determining the estimated value of the indicated torque as a function of a mass flow rate into the cylinder.

4. The method according to claim 1, which comprises determining the setpoint value of the indicated torque as a function of a pedal value and of a rotational speed of the internal combustion engine.

5. The method according to claim 1, which comprises defining the predefined condition as a difference between the estimated value and the setpoint value.

6. A method of monitoring an internal combustion engine, which comprises the following steps:

measuring an excess air factor with an oxygen probe arranged in an exhaust tract of an internal combustion engine;

calculating an estimated value of an amount of fuel actually being metered into a cylinder per working cycle in dependence on the excess air factor determined by the oxygen probe;

actuating an emergency operating mode of the internal combustion engine if the estimated value and a setpoint value of the amount of fuel satisfy a predefined condition.

7. The method according to claim 6, which comprises correcting the excess air factor as a function of a secondary air mass flow rate.

8. The method according to claim 6, which comprises defining the predefined condition as satisfied if a difference between the estimated value and the setpoint value of the amount of fuel is greater than a predefined threshold value for longer than a predefined time period.

9. A device for monitoring an internal combustion engine of the type having an exhaust gas tract and an oxygen probe in the exhaust gas tract, the device comprising:

a first device for calculating an estimated value of an amount of fuel being metered into a cylinder per working cycle, the estimated value of the amount of fuel being calculated as a function of an excess air factor determined by an oxygen probe in the exhaust tract of the internal combustion engine;

a second device for calculating an estimated value of an indicated torque of the internal combustion engine as a function of the estimated value of the amount of fuel; and a third device for controlling an emergency operating mode of the internal combustion engine if the estimated value of the indicated torque and a setpoint value of the indicated torque fulfill a predefined condition.

* * * * *